(12) United States Patent
Mitra et al.

(10) Patent No.: US 8,416,500 B2
(45) Date of Patent: Apr. 9, 2013

(54) DEVICE AND METHOD FOR BEAM FORMING

(75) Inventors: Thomas Mitra, Dortmund (DE); Lutz Aschke, Wetter (DE); Daniel Bartoschewski, Gelsenkirchen (DE)

(73) Assignee: Limo Patentverwaltung GmbH & Co. KG, Dortmund (DE)

( * ) Notice: Subject to any disclaimer, the term of this patent is extended or adjusted under 35 U.S.C. 154(b) by 0 days.

(21) Appl. No.: 12/996,531

(22) PCT Filed: Jun. 5, 2009

(86) PCT No.: PCT/EP2009/004077
§ 371 (c)(1),
(2), (4) Date: Mar. 10, 2011

(87) PCT Pub. No.: WO2009/146949
PCT Pub. Date: Dec. 10, 2009

(65) Prior Publication Data
US 2011/0157706 A1 Jun. 30, 2011

(30) Foreign Application Priority Data
Jun. 6, 2008 (DE) .......... 10 2008 027 231

(51) Int. Cl.
*G02B 27/10* (2006.01)
*G02B 27/14* (2006.01)
*G02B 27/40* (2006.01)

(52) U.S. Cl.
USPC .......... 359/619; 359/618; 359/621; 359/622; 359/630; 359/641

(58) Field of Classification Search .......... 359/618–622, 359/626, 628, 630, 639, 641, 742; 372/25, 372/26, 34, 57, 69, 70, 72, 75, 98; 362/97.1
See application file for complete search history.

(56) References Cited

U.S. PATENT DOCUMENTS

| | | | |
|---|---|---|---|
| 5,153,773 A * | 10/1992 | Muraki et al. | 359/619 |
| 5,463,497 A * | 10/1995 | Muraki et al. | 359/618 |
| 6,494,371 B1 | 12/2002 | Rekow et al. | |
| 6,594,299 B1 * | 7/2003 | Hirano et al. | 372/75 |
| 6,738,407 B2 * | 5/2004 | Hirano et al. | 372/69 |
| 6,853,490 B2 | 2/2005 | Wang et al. | |

(Continued)

FOREIGN PATENT DOCUMENTS

| CN | 1947053 A | 4/2007 |
|---|---|---|
| WO | 2007/140969 A1 | 12/2007 |

OTHER PUBLICATIONS

German Patent and Trademark Office Search Report, Dated Feb. 11, 2009.

*Primary Examiner* — Loha Ben
(74) *Attorney, Agent, or Firm* — Laurence A. Greenberg; Werner H. Stemer; Ralph E. Locher

(57) ABSTRACT

A device for beam forming includes at least two laser light sources capable of emitting laser radiation and an optical device capable of influencing the laser radiation such that the laser radiation has an intensity distribution in a working plane that at least partially corresponds to a top-hat distribution at least with regard to one direction. The laser beam may be at least partially overlapped by the optical device. The laser beam is a single-mode laser beam at least with regard to a direction perpendicular to the distribution direction.

14 Claims, 4 Drawing Sheets

U.S. PATENT DOCUMENTS

| | | |
|---|---|---|
| 7,016,393 B2 | 3/2006 | Anikitchev et al. |
| 7,035,014 B2 * | 4/2006 | Mikhailov et al. ............ 359/641 |
| 7,199,330 B2 | 4/2007 | DeMaria et al. |
| 7,221,694 B2 * | 5/2007 | Hirano et al. .................... 372/75 |
| 7,277,229 B2 | 10/2007 | Kato |
| 7,545,838 B2 | 6/2009 | Fontanella et al. |
| 7,768,705 B2 * | 8/2010 | Mitra et al. .................... 359/569 |
| 7,782,535 B2 * | 8/2010 | Mikliaev et al. ............. 359/623 |
| 7,986,461 B2 * | 7/2011 | Bartoschewski .............. 359/622 |
| 8,081,386 B2 * | 12/2011 | Hauschild et al. ............ 359/618 |
| 8,215,776 B2 * | 7/2012 | Kessler et al. ................... 353/31 |
| 8,270,084 B2 * | 9/2012 | Mikliaev ....................... 359/618 |
| 2004/0061952 A1 | 4/2004 | Coufal et al. |
| 2005/0157762 A1 | 7/2005 | DeMaria et al. |
| 2007/0127131 A1 | 6/2007 | Lissotschenko et al. |
| 2007/0295974 A1 | 12/2007 | Fontanella et al. |

* cited by examiner

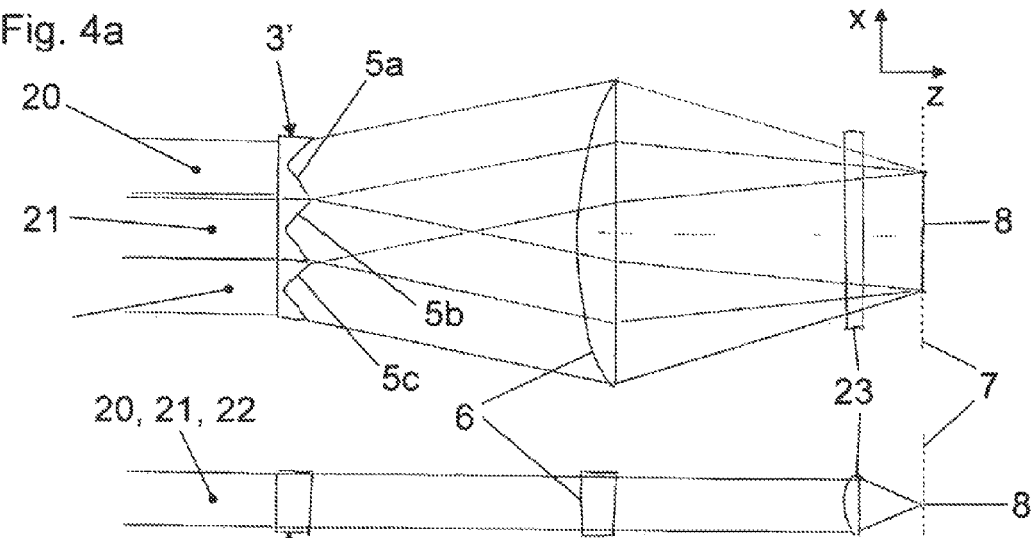
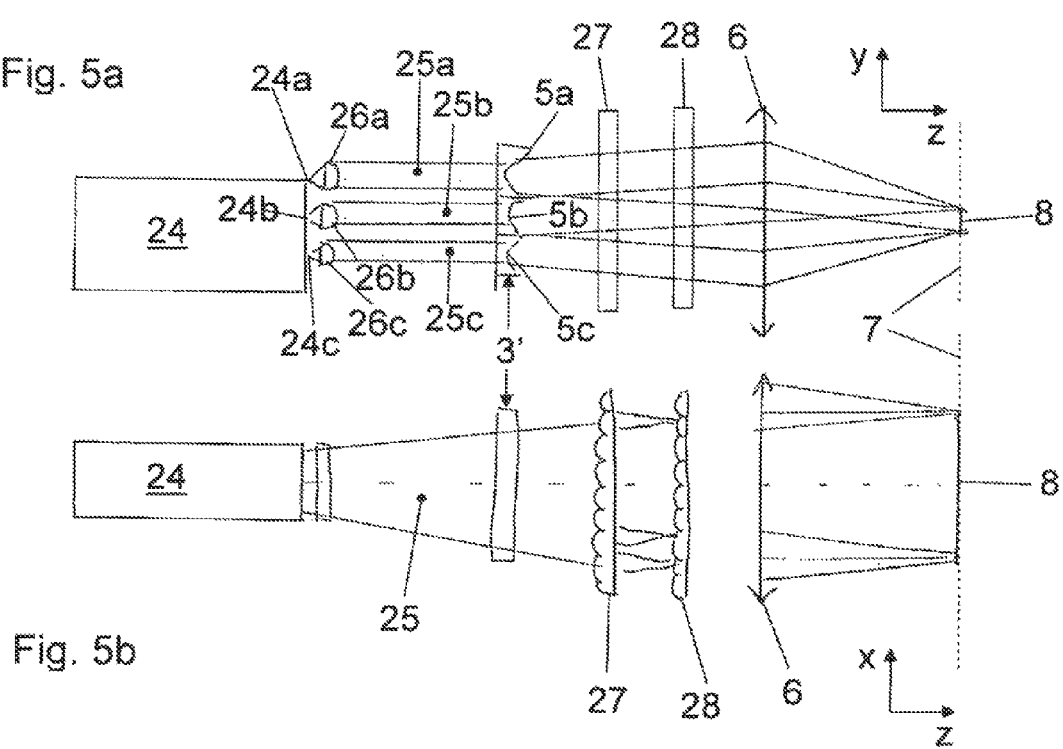

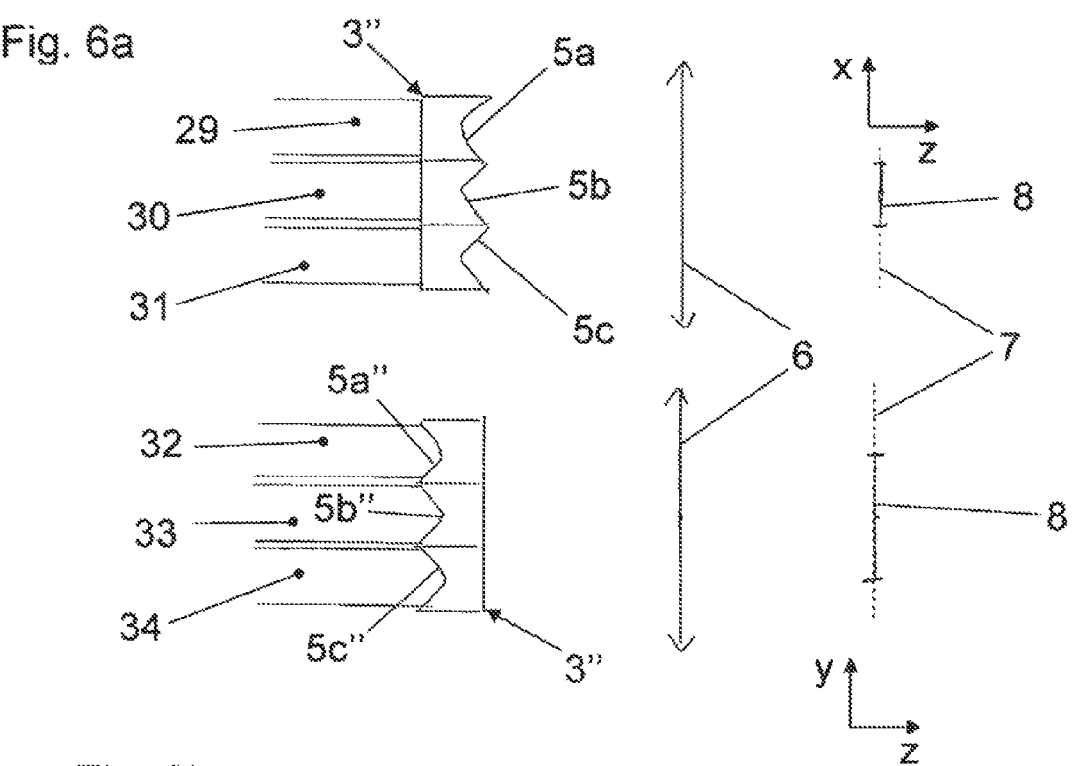

DEVICE AND METHOD FOR BEAM FORMING

BACKGROUND OF THE INVENTION

Field of Invention

The present invention relates to a device for beam shaping and to a method for beam shaping.

Definitions: In the direction of propagation of the laser radiation means the average direction of propagation of the laser radiation, in particular if said radiation is not a plane wave or at least partly divergent. Unless explicitly stated otherwise, laser beam, light beam, partial beam or beam does not mean an idealized beam from geometric optics, but a real light beam, such as a laser beam with a Gaussian profile or with a modified Gaussian profile, which does not have an infinitesimally small beam cross section but rather an extended beam cross section. Top-hat distribution or top-hat intensity distribution or top-hat profile means an intensity distribution that can be substantially described by a rectangular function (rect(x)), at least in respect of one direction. Real intensity distributions, which have deviations from a rectangular function of the order of a few percent or have angled flanks, are likewise denoted as a top-hat distribution or a top-hat profile.

WO 2007/140 969 A1 describes a device that can obtain a narrow, line-shaped and relatively homogeneous intensity distribution in a work plane. There are applications, for example the recrystallization of Si-layers for producing flat screens or solar cells, that require very intensive and very homogeneous lines. This can only be achieved with much technical effort using the device known from the aforementioned prior art.

It is known to use a Powell lens, in conjunction with a Fourier lens, to generate an intensity distribution in a work plane that corresponds to a top-hat distribution. The laser radiation of a semiconductor laser is collimated by a fast-axis collimation lens. Here both the Powell lens and the fast-axis collimation lens have to be adjusted separately and each has to be coated on both sides.

BRIEF SUMMARY OF THE INVENTION

The underlying object of the present invention is the development of a device by means of which more homogeneous and/or more intensive intensity distributions can be generated with less complexity. Furthermore, the present invention is based on the object of developing a device which can be adjusted in a more cost-effective and/or easier fashion. Furthermore, the present invention is based on the object of specifying a method for beam shaping, by means of which more homogeneous and/or more intensive intensity distributions can be generated with less complexity.

In accordance with an object of the invention, a device is provided that includes at least two laser-light sources, the laser radiation of which can at least in part be superposed by the optical means, wherein the laser radiation is a single-mode laser radiation, at least in respect of one direction perpendicular to the direction of propagation. Here the optical means can be both refractive and diffractive optical means or comprise mirrors. The superposition increases the stability of the already very stable single-mode laser-light sources because the variations in the individual laser-light sources are averaged out as a result of the superposition. The use of a plurality of single-mode laser-light sources furthermore makes it easier to scale the power of the intensity distribution in the work plane, for example by the addition or removal of one or more laser-light sources.

There is the option here of the optical means comprising at least one optically functional transformation boundary surface through which at least one partial beam of the laser radiation can pass such that the laser radiation at least in part has in the work plane an intensity distribution that at least in respect of one direction corresponds to a top-hat distribution. By way of example, such a transformation boundary surface can be embodied as a Powell lens or can be part of a Powell lens.

Here the laser radiation from each of the laser-light sources can be associated with one of the transformation boundary surfaces, wherein the transformation boundary surfaces can be arranged in an array. As a result, the laser radiation of each of the laser-light sources is separately transformed into a top-hat angle distribution. A very homogeneous intensity distribution is generated in the work plane by the superposition of these top-hat angle distributions.

Provision can furthermore be made for the optical means to comprise lens means in a Fourier arrangement, which lens means can superpose the laser radiation of the at least two laser-light sources, wherein the lens means are arranged downstream of the at least one transformation boundary surface, particularly in the direction of propagation of the laser radiation to be influenced. These lens means superpose the individual single-mode laser radiations in the work plane, with the top-hat angle distribution at the same time being converted into a top-hat intensity distribution. The lens means in the Fourier arrangement thus contribute to increasing the homogeneity.

There is the option of the laser-light sources having differing wavelengths and/or being different types of laser. This can influence the spectral composition of the intensity distribution in a targeted fashion.

Provision can be made for the at least one transformation boundary surface to have an asymmetrical design. This can correct imaging errors of the lens means in the Fourier arrangement. In the case of a correspondingly asymmetric design of the at least one transformation boundary surface, the superposition function of the lens means can also be integrated into the at least one transformation boundary surface, and so the lens means can be dispensed with.

Provision can furthermore be made for at least two transformation boundary surfaces to be arranged in succession in the direction of propagation of the laser radiation to be influenced. This can provide a transformation optical system with a very large numerical aperture, in which very large angle regions can be utilized.

In accordance with an object of the invention, a device is provided in which the optically functional collimation boundary surface and the optically functional transformation boundary surface are integrated into one component. By way of example, the component here can be a lens with a first surface and a second surface, wherein the first surface corresponds to the optically functional collimation boundary surface and the second surface corresponds to the optically functional transformation boundary surface. Such an embodiment can significantly reduce the production costs and the adjustment complexity of the device.

In accordance with an object of the invention, there is provided a method that includes the following steps:
the laser radiation emanating from at least a first and at least a second laser-light source, which laser radiation respectively is a single-mode laser radiation, at least in respect of a first direction perpendicular to the direction of propagation, is transformed individually such that the two laser radiations have a top-hat angle distribution, at least in respect of the first direction, after the transformation, the two laser radiations are superposed at least in part such that the superposed laser radiations has in a work plane an intensity distribution that at least in respect of the first direction at least in part corresponds to a top-hat intensity distribution.

The separate transformation of the single-mode laser radiations and their subsequent superposition affords the possibility of obtaining significantly more homogeneous intensity distributions, for example very homogeneous line-shaped intensity distributions.

Further features and advantages of the present invention will become clear with the aid of the following description of preferred exemplary embodiments with reference to the attached figures, in which:

BRIEF DESCRIPTION OF THE SEVERAL VIWS OF THE DRAWING

FIG. 4a shows a schematic top view of a fourth embodiment of a device according to the invention;

FIG. 4b shows a schematic side view of the fourth embodiment as per FIG. 4a;

FIG. 5a shows a schematic side view of a fifth embodiment of a device according to the invention;

FIG. 5b shows a schematic top view of the fifth embodiment as per FIG. 5a;

FIG. 6a shows a schematic top view of a sixth embodiment of a device according to the invention;

FIG. 6b shows a schematic side view of the sixth embodiment as per FIG. 6a;

DESCRITION OF THE INVENTION

A Cartesian coordinate system has been sketched in some of the figures for an improved overview. Equivalent or functionally equivalent parts have been denoted by the same reference sign in the various figures.

Figure 1:
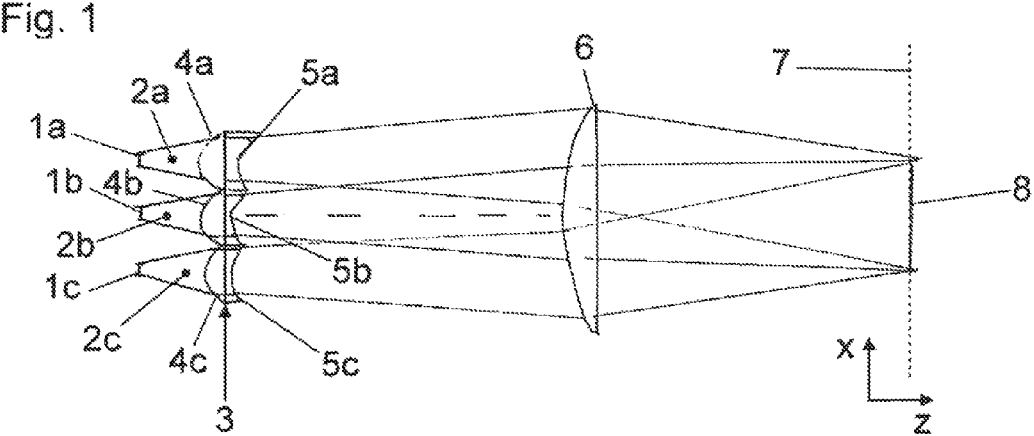
FIG. 1 shows a schematic top view of a first embodiment of a device according to the invention.

The embodiment of a device according to the invention apparent from FIG. 1 comprises three laser-light sources 1a, 1b, 1c from which laser radiation 2a, 2b, 2c emanates. The laser-light sources 1a, 1b, 1c can be emitters of a laser-diode bar arranged next to one another in the X-direction or slow-axis direction. Each of the laser radiations 2a, 2b, 2c is a single-mode laser radiation in respect of the slow-axis direction.

Each of the laser radiations 2a, 2b, 2c can also be a single-mode laser radiation in respect of the fast-axis direction. There is the option of providing at least one fast-axis collimation lens (not illustrated), which can collimate the laser radiation 2a, 2b, 2c in respect of the fast axis.

The device furthermore comprises an array 3, which is arranged downstream of the laser-light sources 1a, 1b, 1c in the direction of propagation Z of the laser radiation 2a, 2b, 2c. On its entry side, the array 3 has a plurality of convex boundary surfaces 4a, 4b, 4c, which serve as slow-axis collimation lenses for the laser radiation 2a, 2b, 2c. In the process, the laser radiation 2a, 2b, 2c from one of the laser-light sources 1a, 1b, 1c respectively penetrates one of the convex boundary surfaces 4a, 4b, 4c. On its emergence side, the array 3 has a plurality of optically functional transformation boundary surfaces 5a, 5b, 5c arranged next to one another. The transformation boundary surfaces 5a, 5b, 5c are used to convert the Gaussian intensity profile of the laser radiations 2a, 2b, 2c into a top-hat angle distribution in respect of the slow-axis direction or in respect of the X-direction, as will be explained in even more detail below.

Lens means 6 in a Fourier arrangement are provided downstream of the array 3 in the direction of propagation Z of the laser radiation 2a, 2b, 2c. By way of example, the lens means 6 can be a spherical or an anamorphic positive lens. The lens means 6 are displayed as an individual lens, but may also consist of a plurality of individual lenses.

As a result of the top-hat angle distribution, the transformation boundary surfaces 5a, 5b, 5c need not be arranged in the entry-side focal plane of the lens means 6. In the emergence-side focal plane of the lens means 6 there is a work plane 7, in which a line-shaped intensity distribution 8 is generated by the superposition of the laser radiations 2a, 2b, 2c emanating from the three laser-light sources 1a, 1b, 1c. This line-shaped intensity distribution 8 has a top-hat distribution in the direction X of extent of the line-shaped intensity distribution 8, which top-hat distribution is generated by the Fourier transformation of the top-hat angle distribution generated by the individual transformation boundary surfaces 5a, 5b, 5c.

If each of the laser radiations 2a, 2b, 2c is also a single-mode laser radiation in respect of the Y-direction, the laser radiation can be better focused into the line-shaped intensity distribution 8 in respect of the Y-direction. This means that thinner line widths or a greater depth of field can be achieved. Furthermore, the focusing can be influenced in a more targeted fashion.

Only three laser-light sources 1a, 1b, 1c and three transformation boundary surfaces 5a, 5b, 5c have been sketched in FIG. 1 and, correspondingly, in some of the other figures. This merely serves for clarification. Provision can by all means be made for significantly more than three laser-light sources 1a, 1b, 1c and, correspondingly, more than three transformation boundary surfaces 5a, 5b, 5c. The width of each of the transformation boundary surfaces 5a, 5b, 5c in the X-direction may correspond to two to three times the beam diameter (FW·1/e$^2$) of the respective laser radiation 2a, 2b, 2d. There is the option of spacing apart the individual transformation boundary surfaces 5a, 5b, 5c in the X-direction. The transition regions here arranged between the individual transformation boundary surfaces 5a, 5b, 5c can have a planar or very steep design, wherein the embodiment thereof can particularly be selected such that laser light passing through the transition regions passes e.g. the lens means 6 and in any case does not contribute to the line-shaped intensity distribution 8.

As a result of the superposition of the single-mode laser radiations from the three laser-light sources 1a, 1b, 1c with the top-hat angle distribution in respect of the X-direction, there is great homogeneity in the X-direction or in the direction of extent of the line-shaped intensity distribution, which homogeneity may, for example, merely have peak to valley (P-V) deviations of <2%.

By way of example, each of the transformation boundary surfaces 5a, 5b, 5c can be a so-called Powell lens.

In general, the function of transformation boundary surfaces 5a, 5b, 5c causing a transformation from a Gaussian profile to a top-hat profile can be based on a phase-shift method.

To this end, an ideal Gaussian beam with known parameters (beam diameter, divergence) is assumed as an input parameter for the optical system or the transformation boundary surface. A spatially adapted phase-shift $\phi$ is generated for the design of the optical system or the transformation boundary surface by means of an iterative method, which phase-shift converts the original Gaussian shape of the laser profile into a top-hat intensity distribution in the target plane.

Mathematically, this object can be solved in an iterative process by minimizing the functional R—here in a dimensionless representation—reproduced below.

$$R = \int |\Im[(2/\sqrt{\pi})^{1/2} e^{-x^2} e^{i\phi}] - (1/\alpha)^{1/2} rect(f/\alpha)|^2 df,$$

where
$\Im$: is a Fourier transform,
$\alpha$: is a spatial scaling factor,
f: is a frequency variable in the Fourier space.

Minimizing the functional R leads to the sought-after phase distribution $\phi$ on the basis of which the shape of the lens or the transformation boundary surface is defined.

Within the functional, the term $(2/\sqrt{\pi})^{1/2} e^{-x^2}$ represents the Gaussian intensity distribution of the incident beam, which is multiplied by a phase factor $e^{i\phi}$.

In order to convert the phase-modulation imparted onto the Gaussian beam into the desired distribution of the output intensity, it is necessary to subject this term to a Fourier transform $\Im$, which in practice is implemented by a field-generating Fourier transform lens—also referred to briefly as a field lens. This is the lens means 6 in the illustrated exemplary embodiment.

The term of the form $(1/\alpha)^{1/2} rect(f/\alpha)$ corresponds to a representation of the top-hat-shaped target intensity distribution.

The factor $\alpha$ is a parameter that fixes the spatial dimension of the target field. By subtracting the terms of the transformed input intensity distribution from the target intensity distribution, the desired functionality of the optical system is now ensured by minimizing the functional R.

Figure 2:
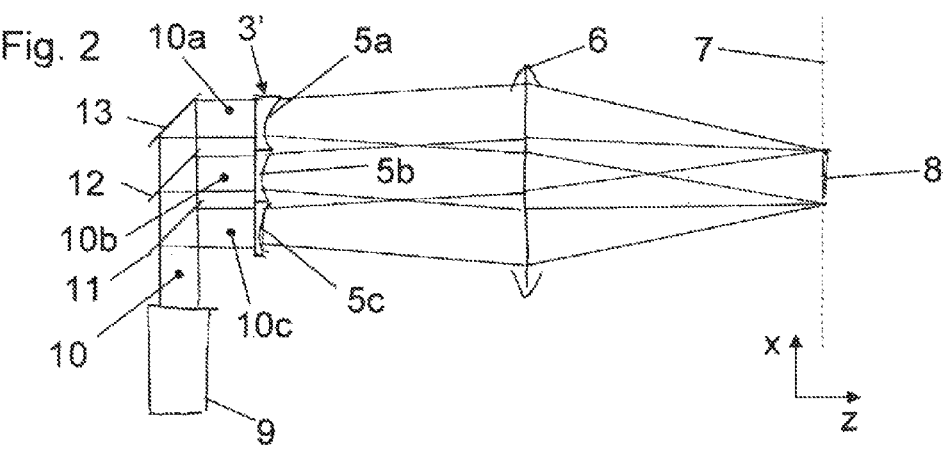
FIG. 2 shows a schematic top view of a second embodiment of a device according to the invention.

In contrast to the first embodiment, the embodiment as per FIG. 2 only provides one laser 9, which can emit laser radiation 10 that at least in respect of one direction likewise is a single-mode laser radiation, but, for example, may also be a single-mode laser radiation in respect of both directions. The laser 9 can be a solid-state laser, such as an Nd:YAG laser, a gas laser or else a fiber laser.

The laser radiation 10 is deflected onto the array 3' to form three mutually parallel partial beams 10a, 10b, 10c by two beamsplitters 11, 12 and a mirror 13. The two beamsplitters 11, 12 and the mirror 13 serve as laser-light sources in this exemplary embodiment, from which laser-light sources the single-mode laser radiation emanates.

By all means, there is also the option of using polarization beamsplitters to divide the laser radiation 10.

On its emergence side, the array 3' has the previously described transformation boundary surfaces 5a, 5b, 5c. The array 3' is planar on its entry side and accordingly does not have collimation lenses. By way of example, the non-divided laser radiation 10 of the laser 9 can already be shaped or collimated by appropriate lens means (not illustrated).

Figure 3:
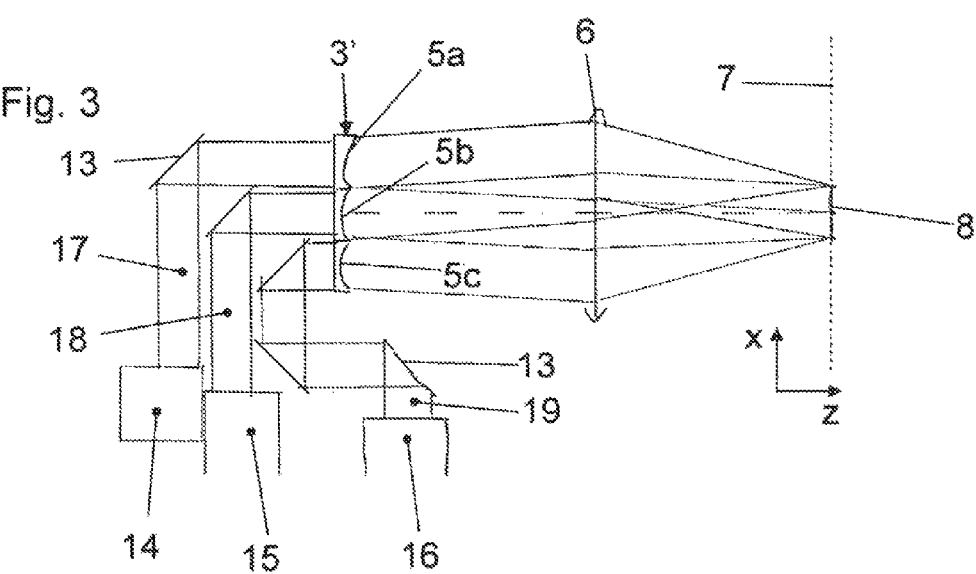
FIG. 3 shows a schematic top view of a third embodiment of a device according to the invention.

In the exemplary embodiment as per FIG. 3, use is made of three lasers serving as laser-light sources 14, 15, 16, which lasers can each emit one laser radiation 17, 18, 19, which can likewise be a single-mode laser radiation at least in respect of one direction, but for example can also be a single-mode laser radiation in respect of both directions. Each of these lasers may also be a solid-state laser, such as an Nd:YAG laser, a gas laser or else a fiber laser. Provision is made for deflection mirrors 13, which deflect the individual laser radiations 17, 18, 19 such that the beam paths to the array 3' are similar. This can ensure that the overall sizes of the laser-light sources 14, 15, 16 do not determine the size of the array 3'.

Three or more lasers (not illustrated) are also provided in the exemplary embodiment as per FIG. 4a and FIG. 4b, which lasers can each emit laser radiation 20, 21, 22, which can likewise be a single-mode laser radiation at least in respect of one direction, but for example can also be a single-mode laser radiation in respect of both directions. Each of these lasers may also be a solid-state laser, such as an Nd:YAG laser, a gas laser or else a fiber laser. Particularly, these can be frequency-doubling Nd:YAG lasers pumped by diode lasers.

The laser radiations 20, 21, 22 and, correspondingly, the transformation boundary surfaces 5a, 5b, 5c of the array 3' are arranged next to one another in the X-direction. A cylinder lens 23 is provided between the lens means 6 and the work plane 7, which cylinder lens focuses the laser radiation 20, 21, 22 in respect of the Y-direction. The cylinder lens 23 can have any shape here, for example an aspheric shape. The line-shaped intensity distribution 8 for example has a length in the X-direction of between 10 mm and 1000 mm and a width in the Y-direction of between 5 µm and 200 µm. Here the line-shaped intensity distribution 8 has a top-hat distribution with great homogeneity in the X-direction.

Such a line-shaped intensity distribution 8 is particularly suitable for the thermal treatment of Si-layers, more particularly for the recrystallization thereof.

There is the option of providing an additional transformation boundary surface in front of the cylinder lens 23, or else in front of the array 3', which additional transformation boundary surface can bring about a top-hat intensity distribution of the line-shaped intensity distribution 8 in respect of the Y-direction.

FIG. 5a and FIG. 5b show a stack 24 of laser diode bars, in which three laser diode bars acting as laser-light sources 24a, 24b, 24c are arranged above one another in the fast-axis direction or Y-direction and from which a laser radiation 25a, 25b, 25c emanates. In respect of the fast-axis direction, each of the laser radiations 25a, 25b, 25c is a single-mode laser radiation. In respect of the slow-axis direction, each of the laser radiations 25a, 25b, 25c may be a multi-mode laser radiation. The individual emitters of the laser diode bars, which individual emitters act as laser-light sources 24a, 24b, 24c and are arranged next to one another in the slow-axis direction or in the X-direction, are not illustrated separately.

In this embodiment, fast-axis collimation lenses 26a, 26b, 26c are provided between the laser diode bars, which act as laser-light sources 24a, 24b, 24c, and the array 3'. The light from the laser diode bars acting as laser-light sources 24a, 24b, 24c is superposed in the Y-direction or in the direction perpendicular to the longitudinal extent of the line-shaped intensity distribution 8 by the lens means 6. The line-shaped intensity distribution 8 has a top-hat distribution in the Y-direction as a result of the transformation boundary surfaces 5a, 5b, 5c of the array 3'.

The fast-axis collimation lenses 26a, 26b, 26c and the transformation boundary surfaces 5a, 5b, 5c can alternatively be integrated into a component, as is still to be explained in detail below with reference to FIG. 7 to FIG. 9.

The device as per FIG. 5a and FIG. 5b furthermore comprises two homogenizers 27, 28, which are formed by cylinder-lens arrays in a conventional fashion. These homogenizers 27, 28 are arranged in the device and embodied such that they homogenize the laser radiation 25 in respect of the slow-axis direction or in respect of the X-direction and superpose said laser radiation in the work plane 7 such that the line-shaped intensity distribution 8 also has a top-hat distribution in the X-direction. This homogenization and achievement of a top-hat distribution in the slow-axis direction is known as such from the prior art.

In the exemplary embodiment as per FIG. 6a and FIG. 6b, nine or more lasers (not illustrated) are provided, which can each emit a laser radiation 29, 30, 31, 32, 33, 34 that is a single-mode laser radiation in respect of both directions. Each of these lasers can also be a single-mode diode laser stack, a solid-state laser such as an Nd:YAG laser, a gas laser or else a fiber laser.

The laser radiations 29, 30, 31, 32, 33, 34 are arranged next to and above one another in two dimensions. On its emergence side, the array 3" has arranged next to one another in the X-direction the previously described transformation boundary surfaces 5a, 5b, 5c, which can transform the laser radiations 29, 30, 31 into a top-hat angle distribution in respect of the X-direction. On the entry side, the array 3" has arranged next to one another in the Y-direction transformation boundary surfaces 5a", 5b", 5c", which can transform the laser radiations 32, 33, 34 into a top-hat angle distribution in respect of the Y-direction. Hence the intensity distribution 8 in the work plane 7 has a top-hat distribution in respect of both directions X, Y and is also very homogeneous in respect of both directions X, Y. The intensity distribution 8 is not a line-shaped intensity distribution but, for example, a rectangular or square intensity distribution.

Figure 7:
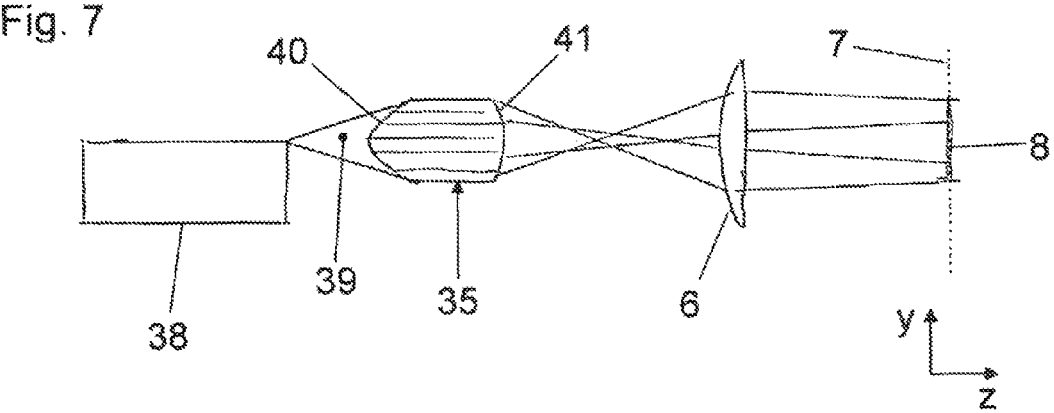
FIG. 7 shows a schematic side view of a seventh embodiment of a device according to the invention.
Figure 8:
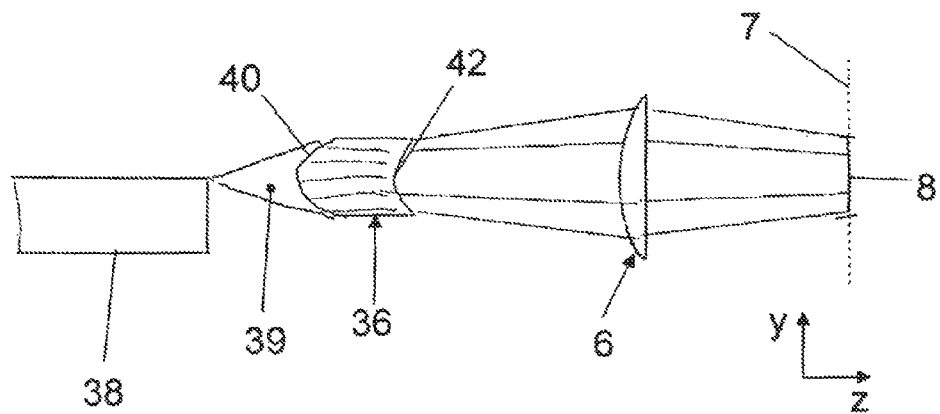
FIG. 8 shows a schematic side view of an eight embodiment of a device according to the invention.
Figure 9:
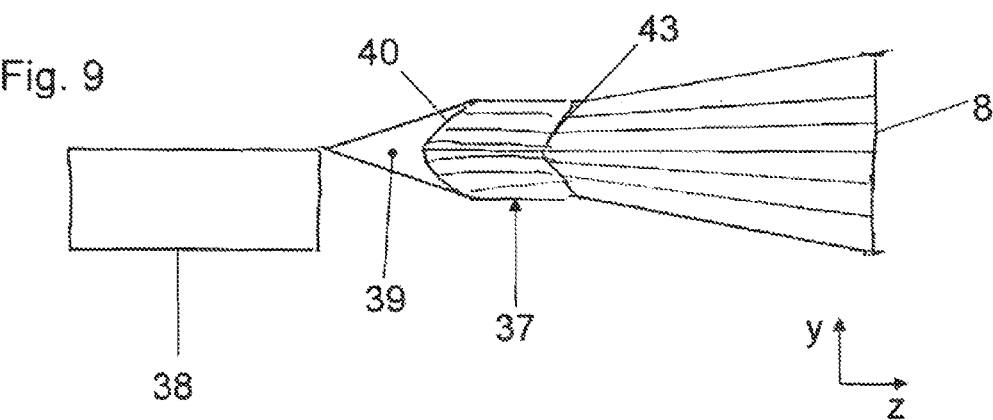
FIG. 9 shows a schematic side view of a ninth embodiment of a device according to the invention.

FIG. 7 to FIG. 9 illustrate how a fast-axis collimation lens and a transformation boundary surface are integrated into a component 35, 36, 37.

Laser radiation 39 is emitted by a semiconductor laser 38 in FIG. 7. The component 35 has a convex collimation boundary surface 40 serving as a fast-axis collimation lens on its first surface serving as an entry surface. The component 35 has a convex transformation boundary surface 41, which can transform the laser radiations 39 into a top-hat angle distribution in respect of the Y-direction, on its second surface serving as an emergence surface. The convex transformation boundary surface 41 can likewise be a Powell lens or can be generated by minimizing the functional R. The lens means 6 converts the top-hat angle distribution into an intensity distribution 8 with a top-hat profile in the work plane 7.

The embodiment as per FIG. 8 merely differs from the one as per FIG. 7 by virtue of the fact that the transformation boundary surface 42 of the component 36 has a concave shape.

In the embodiment as per FIG. 9, the component 37 has a concave transformation boundary surface 43 on its second surface, which transformation boundary surface is embodied such that an intensity distribution 8 with a top-hat profile is generated without a Fourier lens in the near field downstream of the component 37. The transformation boundary surface 43 can also have a convex design.

The invention claimed is:

1. A device for beam shaping, comprising:
   at least two laser-light sources that emit laser radiation in a direction of propagation; and
   an optical device that influences the laser radiation such that the laser radiation has an intensity distribution, with respect to at least one direction, that at least partly corresponds to a top-hat intensity distribution in a work plane;
   said optical device at least partly superposing the laser radiation; and
   the laser radiation being a single-mode laser radiation at least with respect to a direction perpendicular to the direction of propagation.

2. The device according to claim 1, wherein said optical device includes at least one optically functional transformation boundary surface through which at least one partial beam of the laser radiation passes such that the laser radiation has an intensity distribution, with respect to the at least one direction, that at least partly corresponds to a top-hat distribution in a work plane.

3. The device according to claim 2, wherein:
   said at least one optically functional transformation boundary surface is a first optically functional transformation boundary surface, and said first optically functional transformation boundary surface operates on the laser radiation from one of said two laser-light sources.

4. The device according to claim 2, wherein:
   said at least one optically functional boundary surface is a plurality of functional transformation boundary surfaces arranged in an array.

5. The device according to claim 4, wherein said array is a one-dimensional Array is a one-dimensional array or a two-dimensional array.

6. The device according to claim 2, wherein said at least one transformation boundary surface is embodied as a Powell lens or is a part of a Powell lens.

7. The device according to claim 1, wherein:
   said optical device includes at least one optically functional transformation boundary surface;
   said optical device includes lens means in a Fourier arrangement;
   said lens means superposes the laser radiation of said at least two laser-light sources; and
   said lens means is downstream of said at least one optically functional transformation boundary surface in relation to the direction of propagation of the laser radiation to be influenced.

8. The device according to claim 1, wherein said at least two laser-light sources differ from each other in at least one aspect selected from the group consisting of a wavelength and a type of laser.

9. The device according to claim 1, wherein said optical device includes at least one optically functional transformation boundary surface with an asymmetrical design.

10. The device according to claim 1, wherein said optical device includes at least two transformation boundary surfaces arranged in succession in the direction of propagation of the laser radiation to be influenced.

11. A device for beam shaping, comprising
   at least one laser-light source embodied as a semiconductor laser that emits laser radiation with a greater divergence in a fast-axis direction than in a slow-axis direction;
   an optically functional collimation boundary surface that at least partly collimates the divergence of the laser radiation in the fast-axis direction; and
   an optical device with at least one optically functional transformation boundary surface, through which at least one partial beam of the laser radiation passes such that the laser radiation at least in part has an intensity distribution in a work plane that at least with respect to one direction corresponds to a top-hat distribution;
   said optically functional collimation boundary surface and said optically functional transformation boundary surface being integrated into one component.

12. The device according to claim 11, wherein:
said component is a lens having a first surface and a second surface;
said first surface corresponds to said optically functional collimation boundary surface; and
said second surface corresponds to said optically functional transformation boundary surface.

13. A method for beam shaping, which comprises:
obtaining laser radiation from at least a first laser-light source and a second laser-light source, wherein the laser radiation from the first laser-light source and the laser radiation from the second laser-light source emanate in a direction of propagation, the laser radiation that emanates from the first laser light source is a single-mode laser radiation at least with respect to a first direction perpendicular to the direction of propagation, and the laser radiation that emanates from the second laser light source is a single-mode laser radiation at least with respect to the first direction perpendicular to the direction of propagation;
individually transforming the laser radiation from the first laser light source and the laser radiation from the second laser light source to provide the laser radiation from the first laser light source with a top-hat angle distribution at least with respect to the first direction and to provide the laser radiation from the second laser light source with a top-hat angle distribution at least with respect to the first direction; and
at least partly superimposing the laser radiation from the first laser-light source and the laser radiation from the second laser-light source to obtain a superposed laser radiation having an intensity distribution which, at least with respect to the first direction in a work plane, at least partly corresponds to a top-hat intensity distribution.

14. The method according to claim 13, wherein:
a transformation boundary surface performs the step of individually transforming the laser radiation from the first laser light source; and
another transformation boundary surface performs the step of individually transforming the laser radiation from the second laser light source.

\* \* \* \* \*